(12) United States Patent
Kawai et al.

(10) Patent No.: US 8,559,038 B2
(45) Date of Patent: Oct. 15, 2013

(54) AUTOMATIC FILE TRANSFER SYSTEM AND STORAGE MEDIUM

(75) Inventors: Mina Kawai, Nagoya (JP); Tetsuya Nose, Nagoya (JP); Hiroki Inoue, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 365 days.

(21) Appl. No.: 13/041,915

(22) Filed: Mar. 7, 2011

(65) Prior Publication Data

US 2011/0242588 A1    Oct. 6, 2011

(30) Foreign Application Priority Data

Mar. 30, 2010 (JP) ................................ 2010-079681
Dec. 13, 2010 (JP) ................................ 2010-277173

(51) Int. Cl.
  *G06F 3/12* (2006.01)
  *G06F 15/16* (2006.01)
  *G06K 15/22* (2006.01)
  *G06K 15/00* (2006.01)

(52) U.S. Cl.
  USPC ......... 358/1.15; 358/1.4; 358/1.13; 358/1.14; 358/1.16; 709/247

(58) Field of Classification Search
  None
  See application file for complete search history.

(56) References Cited

U.S. PATENT DOCUMENTS

| | | | |
|---|---|---|---|
| 2003/0117638 A1 | 6/2003 | Ferlitsch | |
| 2005/0195434 A1* | 9/2005 | Ohara et al. | 358/1.16 |
| 2006/0119890 A1 | 6/2006 | Nakajima | |
| 2007/0124513 A1* | 5/2007 | Kikuchi | 710/8 |

FOREIGN PATENT DOCUMENTS

| | | |
|---|---|---|
| JP | H07-271535 | 10/1995 |
| JP | 2004-157912 | 6/2004 |

OTHER PUBLICATIONS

Extended European Search Report issued in European Application No. 11156705.3 on Apr. 16, 2013.

* cited by examiner

*Primary Examiner* — Benny Q Tieu
*Assistant Examiner* — Haris Sabah
(74) *Attorney, Agent, or Firm* — McCarter & English, LLP (57) ABSTRACT

An automatic file transfer system includes a personal computer and one or more printers. The automatic file transfer system includes a transfer folder capable of containing one or more files, wherein, when the personal computer recognizes, through plug-and-play, that a printer among the one or more printers which are connected to the personal computer is powered on, if the printer currently recognized is a transfer-target printer, the personal computer executes in a repetitive manner, for the printer currently recognized, processes of: (i) determining whether or not a new file is moved into the transfer folder; and (ii) transferring, if it is determined that a new file is moved into the transfer folder, the new file to the printer currently recognized.

4 Claims, 8 Drawing Sheets

AUTOMATIC FILE TRANSFER SYSTEM AND STORAGE MEDIUM

CROSS REFERENCE TO RELATED APPLICATIONS

The present application claims priority from Japanese Patent Application No. 2010-079681, which was filed on Mar. 30, 2010, and Application No. 2010-277173, which was filed on Dec. 13, 2010, the disclosure of which is incorporated herein by reference in its entirety.

TECHNICAL FIELD

The disclosure relates to an automatic file transfer system with which a file is automatically transferred to a printer connected to a personal computer and also relates to a storage medium.

BACKGROUND

There have conventionally been known many printers, and among which are printers wherein a print or a display process is executed using preinstalled data of characters, images or templates for layouts, etc. and in addition to these printers there are printers wherein a user can freely store data of characters, images or templates for layouts and a print or a display process is executed using the freely-stored data. In some printers, the data set freely by the user can be created at the printer, and in other printers, the data can be transmitted from a personal computer.

In a conventional printer, each piece of data transmitted from the personal computer is controlled as a file for each piece of data. From the personal computer, a file can be transmitted to plural printers; however, the file is not necessarily compatible to all the plural printers. Many files are of a kind compatible to a specific printer or a specific model of a printer. Accordingly, there is a case in which files are controlled in the personal computer so as to be sorted into different folders according to corresponding printers or models of printers and then stored, so that a user can be spared troubles of operation to determine whether to transmit a file to a certain printer or not when transmitting the file. Alternatively, there is also a case in which printer information is added to each of the files, instead of sorting the files into different folders.

In case files are each sorted into and stored in each of the corresponding folders, in an example of conventional transmission software that transmits files from a personal computer to plural printers, files of a template for a layout or of external character data are stored in different folders in the personal computer according to the predetermined classification, and in the personal computer in which the transmission software is activated, first of all, a user is asked to designate a folder, namely, a classification of a file transmission source, using a predetermined window. Then, the user is asked to designate a file to be transmitted using another window, transmission is set to the file, and the file to which transmission is set is transmitted to a printer.

However, in the above conventional transmission software, even if the transmission software is activated in a personal computer, a file cannot be transmitted from the personal computer to a printer unless many manual operations are conducted by a user.

SUMMARY

The disclosure has been made in view of the above-described problem, and the object of the disclosure is to provide an automatic file transfer system that automatically transfers a new file which is moved to a transfer folder to a printer connected to a personal computer and to provide a storage medium.

To achieve the purpose of the disclosure, according to one aspect of the disclosure, there is provided an automatic file transfer system including a personal computer and one or more printers, the automatic file transfer system including a transfer folder capable of containing one or more files, wherein, when the personal computer recognizes, through plug-and-play, that a printer among the one or more printers which are connected to the personal computer is powered on, if the printer currently recognized is a transfer-target printer, the personal computer executes in a repetitive manner, for the printer currently recognized, processes of: (i) determining whether or not a new file is moved into the transfer folder; and (ii) transferring, if it is determined that a new file is moved into the transfer folder, the new file to the printer currently recognized.

According to another aspect of the disclosure, there is provided a storage medium storing a program designed to execute processes (i) through (ii) below in a repetitive manner at an automatic file transfer system including a personal computer and one or more printers, using the personal computer, the automatic file transfer system including: a transfer folder capable of containing one or more files, wherein, when the personal computer recognizes, through plug-and-play, that a printer among the one or more printers which are connected to the personal computer is powered on, if the printer currently recognized is a transfer-target printer, the personal computer executes in a repetitive manner, for the printer currently recognized, the processes of: (i) determining whether or not a new file is moved into the transfer folder; and (ii) transferring, if it is determined that a new file is moved into the transfer folder, the new file to the printer currently recognized.

DETAILED DESCRIPTION

A detailed description of an exemplary embodiment of an automatic file transfer system and a storage medium of the disclosure will now be given referring to the accompanying drawings

[1. Outline of the Disclosure]

A detailed description of one embodiment directed to the disclosure will be given by referring to drawings. First, there will be described the outline of an automatic file transfer system directed to the one embodiment directed to the disclosure by referring to FIG. 1 through FIG. 3.

Figure 1:
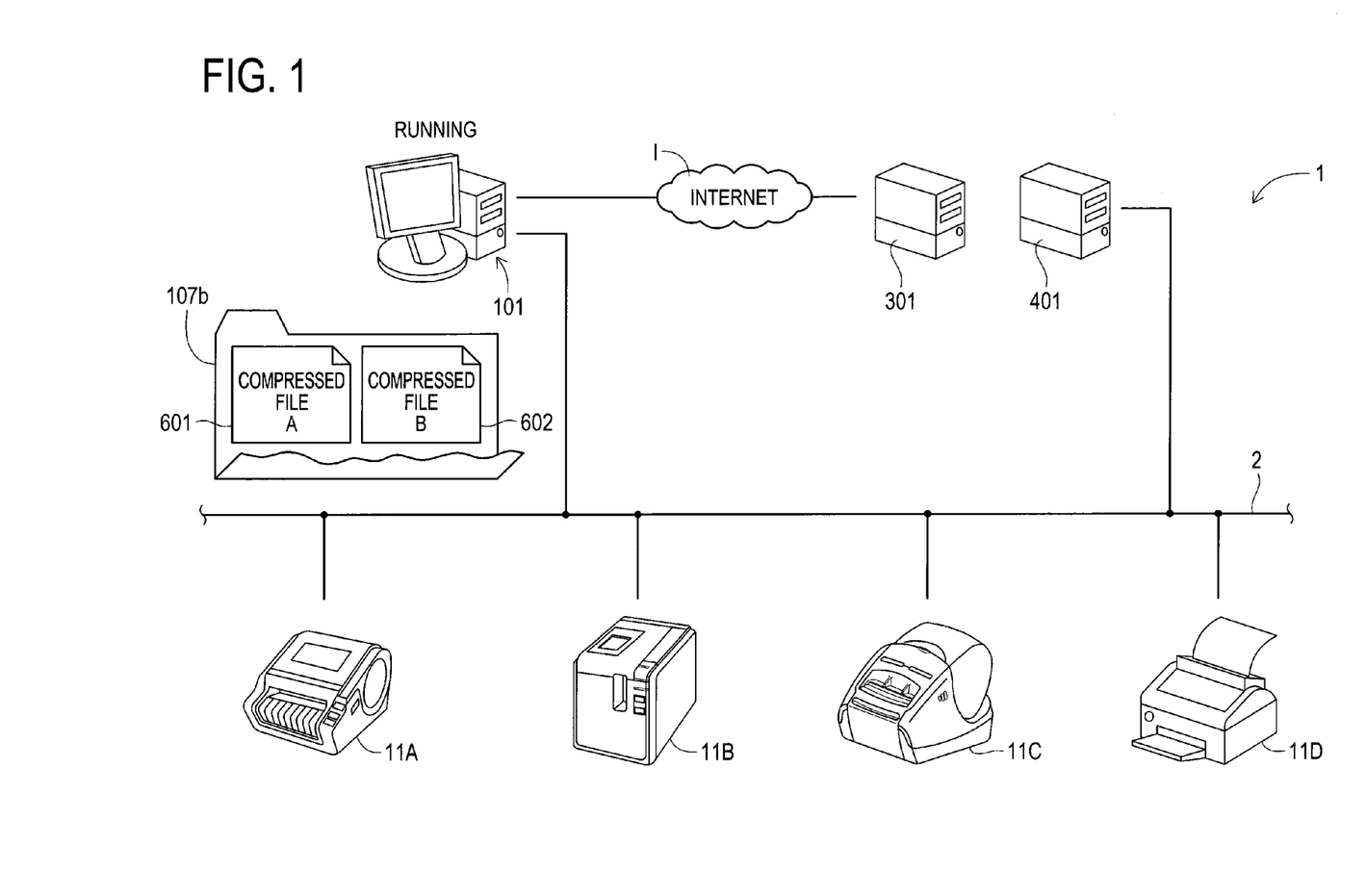
FIG. 1 is a schematic diagram illustrating an automatic file transfer system directed to one embodiment of the disclosure.
Figure 2:
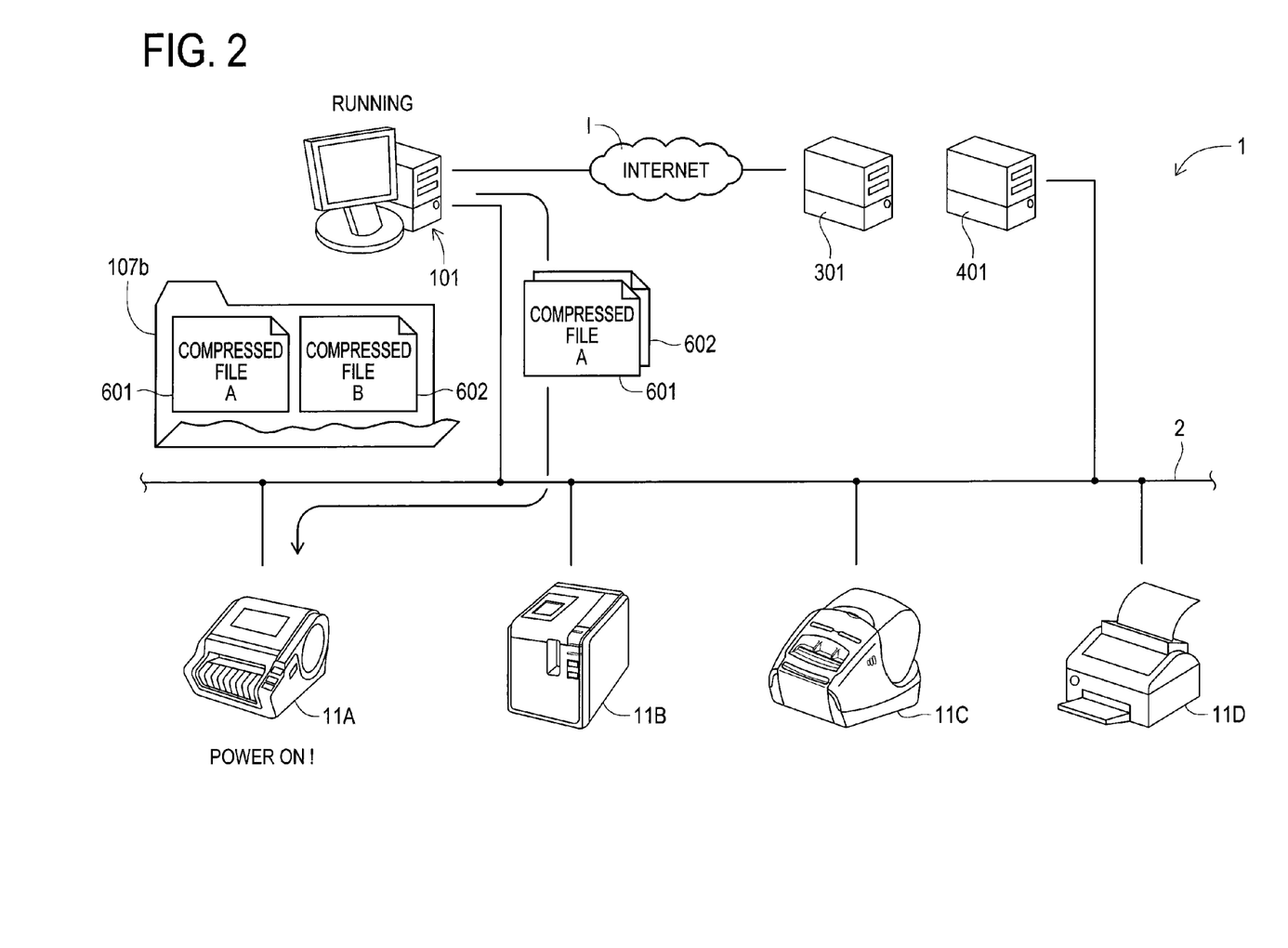
FIG. 2 is a schematic diagram illustrating the automatic file transfer system.
Figure 3:
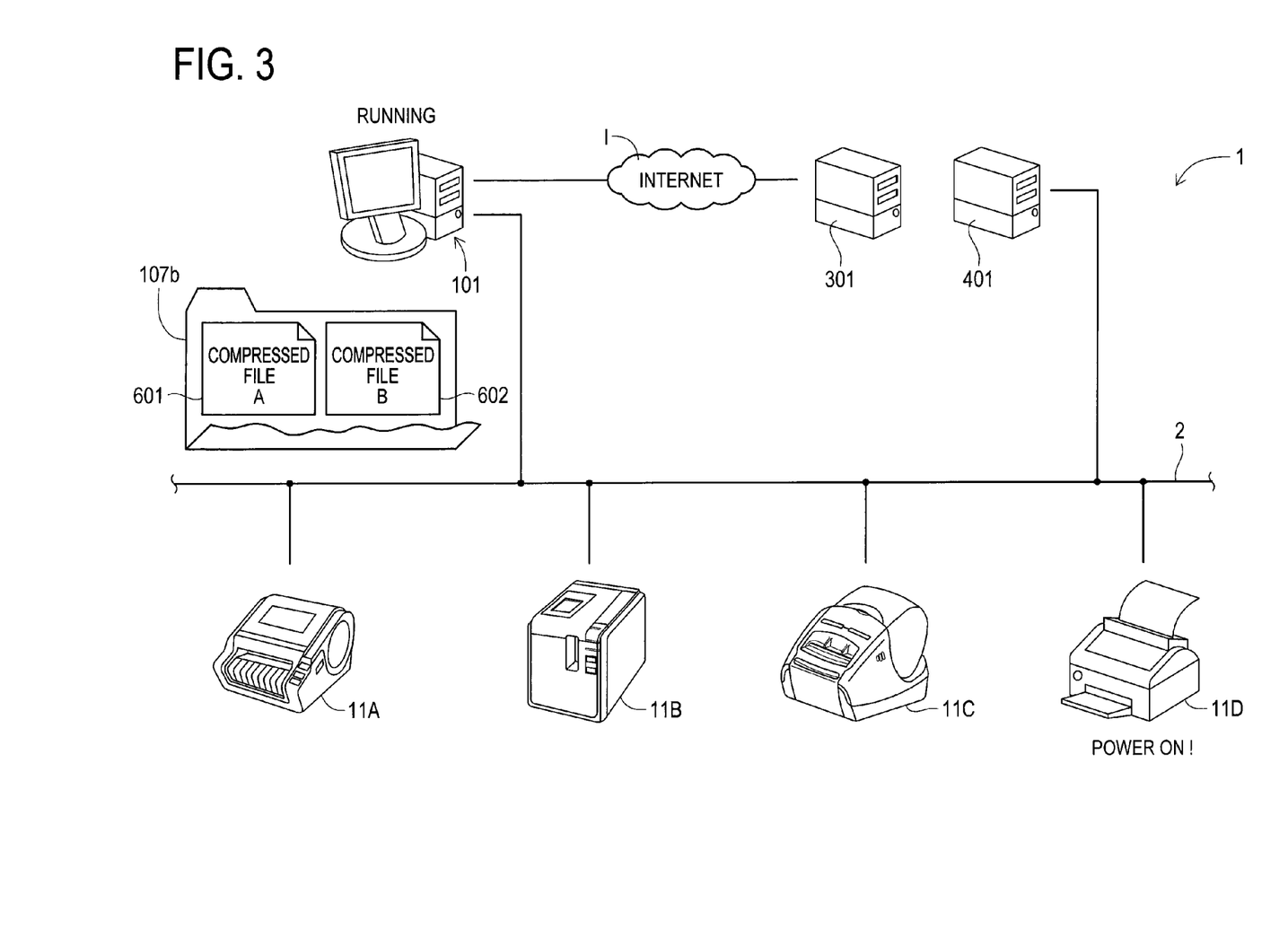
FIG. 3 is a schematic diagram illustrating the automatic file transfer system.

As illustrated in FIG. 1 through FIG. 3, in the automatic file transfer system 1 directed to the one embodiment, a personal computer 101 is connected through a local area network (LAN) 2 to a first printer 11A, a second printer 11B, a third printer 11C, a fourth printer 11D, a network server 401, and the like. Further, through the Internet I, the personal computer 101 is connected to a Web server 301, and the like.

Further, in the automatic file transfer system 1 directed to the one embodiment, the personal computer 101 is provided with a transfer folder 107b. In the transfer folder 107b, a compressed file A 601 and a compressed file B 602 are placed each as an object to be transferred. However, a transfer destination (target printer) of a file placed in the transfer folder 107b is specified in advance.

Here, each of the first printer 11A, the second printer 11B, and the third printer 11C is a "label printer," and is set as the transfer destination (target printer) of a file placed in the transfer folder 107b. Whereas the fourth printer 11D is a "page printer", a "line printer," or the like and excluded from the transfer destination (target printer) of a file placed in the transfer folder 107b.

In the automatic file transfer system 1 directed to the one embodiment, if, for instance, the first printer 11A is powered on as illustrated in FIG. 2 while the personal computer 101 is activated, the compressed file A 601 and the compressed file B 602 are automatically transferred to the first printer 11A from the transfer folder 107b in the personal computer 101. This operation is the same as to the second printer 11B and to the third printer 11C.

Though not illustrated, if a new file is placed in the transfer folder 107b in the personal computer 101 while the power of the first printer 11A is on, the new file is automatically transferred to the first printer 11A from the transfer folder 107b in the personal computer 101 in the same manner. This operation is also the same as to the second printer 11B and to the third printer 11C.

Meanwhile, in the automatic file transfer system 1 directed to the one embodiment, for example, if the fourth printer 11D is powered on as illustrated in FIG. 3 while the personal computer 101 is activated, none of the compressed file A 601 and the compressed file B 602 is automatically transferred to the fourth printer 11D from the transfer folder 107b in the personal computer 101. This is because the fourth printer 11D is excluded from the transfer destination (target printer) of a file placed in the transfer folder 107b, as described above.

Accordingly, though not illustrated, if a new file is placed in the transfer folder 107b in the personal computer 101 while the power of the fourth printer 11D is on, the new file will never be automatically transferred to the fourth printer 11D from the transfer folder 107b in the personal computer 101 likewise.

As above mentioned, in the automatic file transfer system 1 directed to the one embodiment, the personal computer 101 has therein the transfer folder 107b in which is placed a file which is to be automatically transferred to the first printer 11A, the second printer 11B and the third printer 11C, but such a transfer folder may be provided in the Web server 301 or in the network server 401.

However, the location setting of the transfer folder is manually changed by a user at the personal computer 101. That is, when changing the location setting of the transfer folder, a user makes the personal computer 101 display a window for the change.

Figure 6:
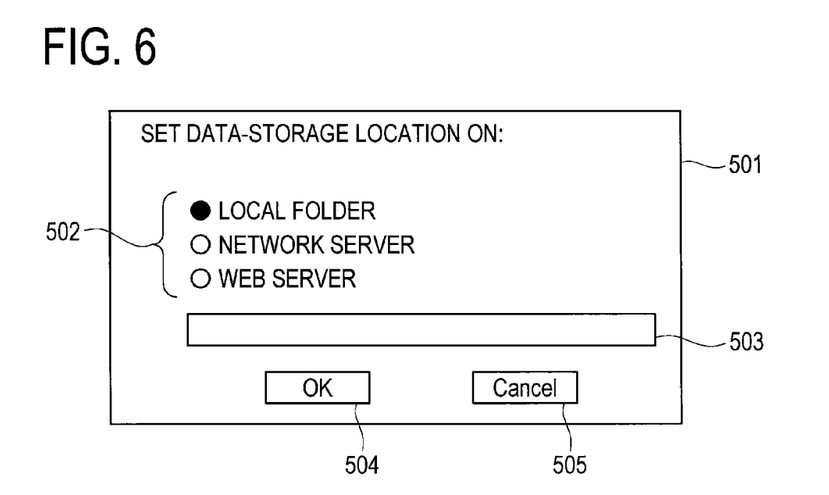
FIG. 6 is a front view illustrating a window for changing a location setting of a transfer folder.
Figure 7:
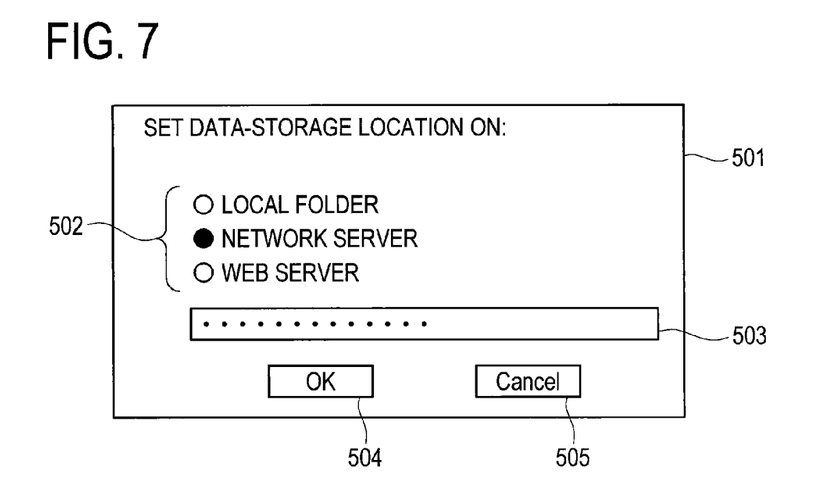
FIG. 7 is a front view illustrating a window for changing the location setting of the transfer folder.

On a window 501 displayed on the personal computer 101, as illustrated in FIG. 6 and FIG. 7, there are displayed three radio buttons 502, an edit box 503, an OK button 504, a cancel button 505, a message saying "Set data-storage location on:" and the like. Through clicking a radio button 502 positioned at the head of an item displaying a location to set a transfer folder and then clicking the OK button 504, the user can change the location setting for the transfer folder.

In the example of FIG. 6, a mark indicating ON is put on the radio button 502 positioned at the head of an item "Local Folder," then if the OK button 504 is clicked under this state, a transfer folder is set in the personal computer 101. In principle, a path in the personal computer 101 is to be input in the edit box 503 to set a transfer folder, but the OK button 504 can be clicked without an input. In this case, it is regarded that the same folder as the application is designated.

In the example of FIG. 7, a mark indicating ON is put on the radio button 502 positioned at the head of an item "Network Server," then if the OK button 504 is clicked under this state, a transfer folder is set in the network server 401. However, in this case, unless a path within network server 401 is input in the edit box 503, the OK button 504 cannot be clicked.

In addition, a transfer folder can be set in the Web server 301. The window 501 corresponding to this setting is not illustrated in FIG. 6 or FIG. 7, but a user can click the radio button 502 positioned at the head of an item "Web Server" and put a mark indicating ON therein, then click the OK button 504. With this operation, a transfer folder is set in the Web server 301. However, also in this case, unless a URL of the Web server 301 is input in the edit box 503, the OK button 504 cannot be clicked.

[2. Configuration of the Disclosure]

Figure 4:
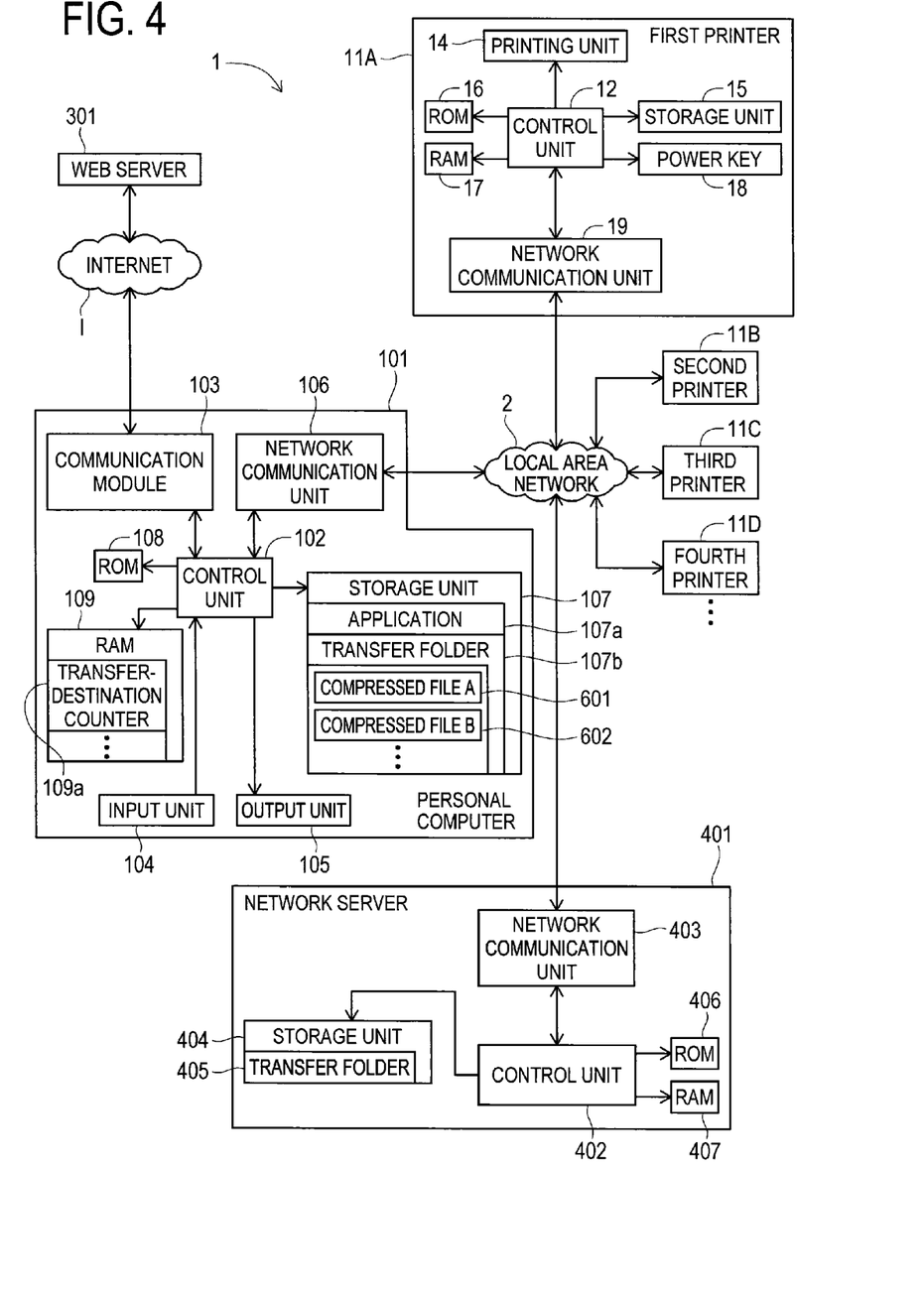
FIG. 4 is a block diagram illustrating the automatic file transfer system.

As illustrated in the block diagram of FIG. 4, the automatic file transfer system 1 directed to the one embodiment is provided with the personal computer 101, the local area network (LAN) 2 and the Internet I, and further, the Web server 301 which is connected to the Internet I, and printers 11A, 11B, 11C and 11D which are connected to the local area network (LAN) 2, the network server 401, and the like.

The personal computer 101 is a host of the printers 11A, 11B, 11C and 11D, and includes a control unit 102, a communication module 103, an input unit 104, an output unit 105, a network communication unit 106, a storage unit 107, ROM 108, RAM 109 and so on. The control unit 102 is a microcontroller configured to control the above constituent elements and the like, and also configured to execute various kinds of programs. The communication module 103 is a unit for making a connection to the Internet I. The input unit 104 is made up with various operation buttons provided on a keyboard, or with a mouse, etc. As for the output unit 105, a liquid crystal display or the like is used. The network communication unit 106 is a unit for making a connection to the local area network (LAN) 2. The storage unit 107 secures, using flash ROM, an area 107a storing an application, a transfer folder 107b, an area, which is not illustrated, storing printer drivers corresponding to the printers 11A, 11B, 11C and 11D respectively and an area storing a later-described transfer tool, which is also not illustrated, and the like. The application is an applicative program for realizing the automatic file transfer as above described referring to FIG. 1 through FIG. 3, FIG. 6 and FIG. 7, and may be stored in the ROM 108. In the transfer folder 107b, there are placed files which are to be automatically transferred to the first printer 11A, the second printer 11B and the third printer 11C, as above mentioned. In FIG. 4, the compressed file A 601 and the compressed file B 602 are placed therein according to the example as illustrated in FIG. 1 through FIG. 3 and FIG. 6 above. The ROM 108 stores various kinds of control programs, etc. The RAM 109 provides work areas for executing the various control programs in the control unit 102, so that, for example, a later-described transfer-destination counter 109a is secured therein. An activated program except some program (such as a boot program) is executed on the RAM 109 once a command code thereof is copied from a medium (such as the storage unit 107 or the ROM 108) which stores the program to the RAM 109. Then, when the program is quit, the copy of the command code which has been copied on the RAM 109 is abolished.

The first printer 11A is a "label printer" whose host is the personal computer 101 and includes a control unit 12, a printing unit 14, a storage unit 15, ROM 16, RAM 17, a power key 18, a network communication unit 19 and so on. The control unit 12 is a microcontroller configured to control the above constituent elements and the like, and also configured to execute various kinds of programs. The printing unit 14 is configured to print on a printing medium for a label based on a printer command (such as a print command or print data). The storage unit 15 stores contents to be printed on a print medium for a label, etc. The ROM 16 stores various kinds of control programs, etc. The RAM 17 provides work areas for executing the various control programs in the control unit 12. As for the power key 18, a press-down button or the like is used. The network communication unit 19 is a unit for making a connection to the local area network (LAN) 2.

Since the second printer 11B, the third printer 11C and the fourth printer 11D are configured similarly in comparison with the first printer 11A, illustrations of their respective constituent elements and descriptions will be omitted. However, the fourth printer 11D is a "page printer" or a "line printer," whose host is the personal computer 101, and executes a print on cut sheet paper (of size A4, for instance). Further, as above mentioned, the first printer 11A, the second printer 11B and the third printer 11C are each set as the transfer destination (target printer) of a file placed in the transfer folder 107b. Whereas the fourth printer 11D is excluded from the file transfer destination (target printer) of a file placed in the transfer folder 107b. These settings are decided at the personal computer 101.

The network server 401 is a server provided at the local area network (LAN) 2, and includes a control unit 402, a network communication unit 403, a storage unit 404, ROM 406, RAM 407, and so on. The control unit 402 is a microcontroller configured to control the above constituent elements and the like, and also configured to execute various kinds of programs. The network communication unit 403 is a unit for making a connection to the local area network (LAN) 2. The storage unit 404 uses flash ROM, etc., and is provided with a transfer folder 405 and so on. The ROM 406 stores various kinds of control programs, etc. The RAM 407 provides work areas for executing the various control programs in the control unit 402.

The Web server 301 is a public server provided on the Internet I, and is a server where a transfer folder can be set, as described above.

Figure 5:
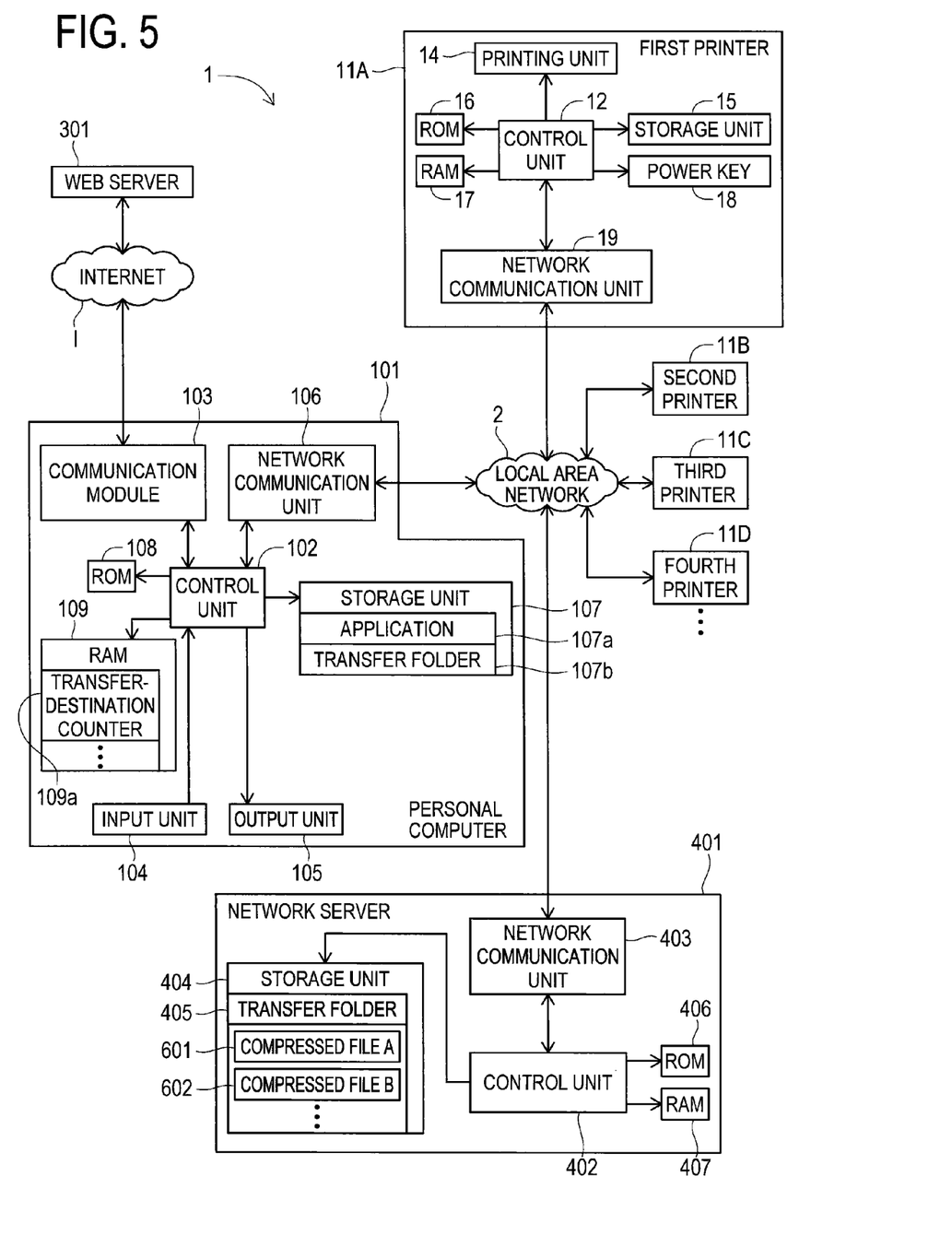
FIG. 5 is a block diagram illustrating the automatic file transfer system.

If a transfer folder is set in the network server 401 as in the example of FIG. 7, the compressed file A 601 and the compressed file B 602 are placed in the transfer folder 405 in the storage device 404 provided in the network server 401, as illustrated in FIG. 5. The detailed description of FIG. 5 is omitted because the block diagram of FIG. 5 is the same as the block diagram of FIG. 4 except the location where the compressed file A 601 and the compressed file B 602 are placed.

[3. Operation According to the One Embodiment]

Figure 8:
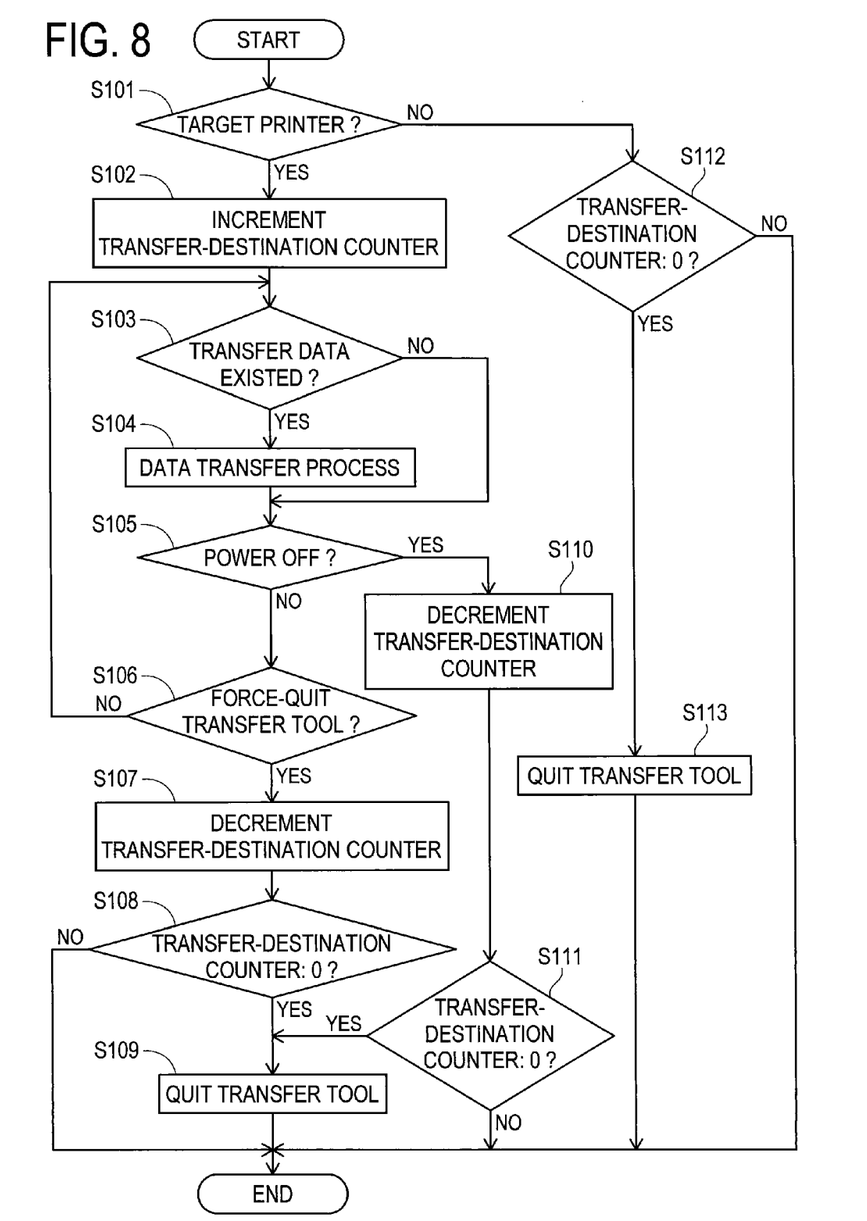
FIG. 8 is a flowchart of a program that realizes an operation of the automatic file transfer system.

The program illustrated in the flowchart of FIG. 8 is a program for major part of an application stored in the area 107a of the storage unit 107 in the personal computer 101. The program illustrated in the flowchart of FIG. 8 is executed on the personal computer 101 which is activated.

This program is a program designed to be activated when a printer which is recognized through plug-and-play appears among the printers connected to the personal computer 101, and as above discussed, after copied to the RAM 109, the program code is executed on the RAM 109. In this case, if the copied program code already exists in the RAM 109 and is executed on the RAM 109, the program code is not to be copied to the RAM 109. That is, at most one copy of the program code is allowed to exist on the RAM 109. Further, this program is executed as a multitask program, and every time a printer which is recognized through the plug-and-play appears, one subject for executing this program is provided (one task to execute this program is generated), and this program is carried out from the first step S101. This program is carried out in the control unit 102, but to put it another way, the control unit 102 is made up of a plurality of CPUs (of the same number as the printers recognized through the plug-and-play), and the operation thereof is similar to executing one program code copied on the RAM 109 while sharing the one program code. In a similar manner, the above transfer tool is shared with plural subjects (plural tasks), and the transfer-destination counter 109a on the RAM 109 is also shared with plural subjects (plural tasks). If there exist plural subjects (tasks), codes in different locations in this program may be simultaneously executed.

The operation discussed below is an operation in one subject (one task). According to FIG. 8, in the operation of the automatic file transfer system 1 directed to the one embodiment, the control unit 102 first determines, in S101, whether or not a printer where the power is turned on among the printers connected to the personal computer 101 is a "target printer." The printer where the power is turned on among the printers connected to the personal computer 101 is recognized through the plug-and-play by the control unit 102. It is determined, in accordance with a piece of information written in a printer driver corresponding to the printer currently recognized, whether or not the printer recognized by the control unit 102 is a "target printer." That is, an area, which is not illustrated, where a printer driver is stored in the storage unit 107 is referenced for the determination.

Here, if the printer whose power is turned on among the printers connected to the personal computer 101 is a "target printer" (YES at S101), the control unit 102 shifts the process to S102.

At S102, the control unit 102 increments the transfer-destination counter 109a secured in the RAM 109 by "1". The initial value of the transfer-destination counter 109a is "0". The control unit 102 then shifts the process to S103.

At S103, the control unit 102 determines whether or not transfer data exists. In the determination, it is determined whether or not a new file is placed in the transfer folder whose location setting is set by a user. Here, if no transfer data exists, namely, if no new file is placed in the transfer folder whose location setting is set by a user (NO at S103), the control unit 102 shifts the process to S105 below without executing anything. Meanwhile, if transfer data exists, namely, if a new file is placed in the transfer folder whose location setting is set by a user (YES at S103), the control unit 102 shifts the process to S104.

At S104, a data transfer process is executed. In the data transfer process, the file newly placed in the transfer folder whose location setting is set by a user is transferred to the "target printer," whose power is recognized to be turned on. The control unit 102 then shifts the process to S105.

At S105, the control unit 102 determines whether or not the power of the "target printer" recognized at S101 is turned off. Here, if the power of the "target printer" recognized at S101 above is not turned off (NO at S105), the control unit 102 shifts the process to S106.

At S106, the control unit 102 determines whether or not to force-quit the "transfer tool" with respect to the "target printer" recognized at S101 above. This determination is carried out by an operation of a user through the input unit 104. Here, if it is determined not to force-quit the "transfer tool" with respect to the "target printer" recognized at S101 above (NO at S106), the control unit 102 returns to S103 above. Meanwhile, if it is determined to force-quit the "transfer tool" with respect to the "target printer" recognized at S101 above (YES at S106), the control unit 102 shifts the process to S107.

At S107, the control unit 102 decrements the transfer-destination counter 109a secured in the RAM 109 by "1". The control unit 102 then shifts the process to S108.

At S108, the control unit 102 determines whether or not value "0" is indicated in the transfer-destination counter 109a secured in the RAM 109. Here, if it is determined that value "0" is indicated in the transfer-destination counter 109a secured in the RAM 109 (YES at S108), the control unit 102 shifts the process to S109, quits the "transfer tool," and following this, terminates this program. Meanwhile, if it is determined that value "1" or more is indicated in the transfer-destination counter 109a secured in the RAM 109 (NO at S108), the control unit 102 terminates this program without executing anything.

Further, at S105 above, if the "target printer" recognized at S101 above is powered off (YES at S105), the control unit 102 shifts the process to S110. At S110, the control unit 102 decrements the transfer-destination counter 109a secured in the RAM 109 by "1". The control unit 102 then shifts the process to S111.

At S111, the control unit 102 determines whether or not value "0" is indicated in the transfer-destination counter 109a secured in the RAM 109. Here, if it is determined that value "0" is indicated in the transfer-destination counter 109a secured in the RAM 109 (YES at S111), the control unit 102 shifts the process to S109, quits the "transfer tool," and following this, terminates this program. Meanwhile, if it is determined that value "1" or more is indicated in the transfer-destination counter 109a secured in the RAM 109 (NO at S111), the control unit 102 terminates this program without executing anything.

Further, if, at S101 above, the printer where the power is turned on among the printers connected to the personal computer 101 is not a "target printer" (NO at S101), the control unit 102 shifts the process to S112.

At S112, the control unit 102 determines whether or not value "0" is indicated in the transfer-destination counter 109a secured in the RAM 109. Here, if it is determined that value "0" is indicated in the transfer-destination counter 109a secured in the RAM 109 (YES at S112), the control unit 102 shifts the process to S113, quits the "transfer tool," and following this, terminates this program. Meanwhile, if it is determined that value "1" or more is indicated in the transfer-destination counter 109a secured in the RAM 109 (NO at S112), the control unit 102 terminates this program without executing anything.

[4. Outline of the One Embodiment]

As has been discussed in detail, the automatic file transfer system 1 directed to the present embodiment, namely, the automatic file transfer system 1 wherein an application program stored in the area 107a of the storage unit 107 is executed at the personal computer 101, is provided with the transfer folder 107b, 405, etc. configured to contain one or more files 601, 602, etc., and when the personal computer 101 recognizes through plug-and-play that the power is on at a printer among one or more printers 11A, 11B, 11C, 11D, etc. connected to the personal computer 101, the following processes (i) through (ii) are repeatedly executed for each printer thus recognized if the printer thus recognized is a printer of a transfer-target ("target printer") (YES at S101). That is, in the personal computer 101, and (i) it is determined whether or not a new file is moved to the transfer folder (whose location setting is set by a user) (S103), (ii) if it is determined that a new file is moved to the transfer folder (YES at S103), the new file is transferred to the printer currently recognized ("target printer") (S104), and accordingly, it is made possible to automatically transfer the new file moved to the transfer folder to the printer ("target printer") connected to the personal computer 101.

Accordingly, troubles in the operation to transfer a file can be saved, safe file transfer can be ensured, and erroneous file transfer can be prevented in a case where the same file is transferred to plural printers ("target printers").

Furthermore, in the automatic file transfer system 1 directed to the present embodiment, namely, in the automatic file transfer system 1 wherein an application program stored in the area 107a of the storage unit 107 is executed at the personal computer 101, for a condition to terminate the processes (i) through (ii), the personal computer 101 executes the processes (A) through (D) below. Namely, the personal computer 101: (A) increments the transfer-destination counter 109a by "1" when recognizing through plug-and-play that the powered is on at a printer among the one or more printers 11A, 11B, 11C, etc., each of which is a "target printer" (S102) and connected to the personal computer 101; (B) decrements the transfer-destination counter 109a by "1" when recognizing that the printer currently recognized is powered off (S110); (C) decrements the transfer-destination counter 109a by "1" when a force-quit signal is received based on an operation of a user through the input unit 104 (S107); and (D) terminates the processes (i) through (ii) (S109, S113) when the transfer-destination counter 109a indicates "0" (YES at S108, YES at S111, YES at S112). Thereby, the personal computer 101 can use the transfer-destination counter 109a as in the program illustrated in FIG. 8, and can formulate the timing to quit the automatic transfer with a simple program configuration.

Further, according to the automatic file transfer system 1 directed to the one embodiment, namely, in the automatic file transfer system 1 wherein an application program stored in the area 107a of the storage unit 107 is executed at the personal computer 101, the transfer folder 107b, 405 can be set within the local area network (LAN) 2 which connects the personal computer 101 to each of the one or more printers 11A, 11B, 11C, 11D, etc., therefore if one or more printers among the printers 11A, 11B, 11C, 11D, etc. are arranged locally, being set through the connection of the local area network (LAN) 2, the above effects can still be obtained.

[5. Details of Another Embodiment]

A description of an automatic file transfer system according to another embodiment of the disclosure will next be given referring to FIG. 9. This embodiment is almost similar to the above one embodiment except the processing of the application, therefore the differences therebetween are mainly discussed. Here, the same reference signs are assigned to the portions identical with those in the above one embodiment.

Figure 9:
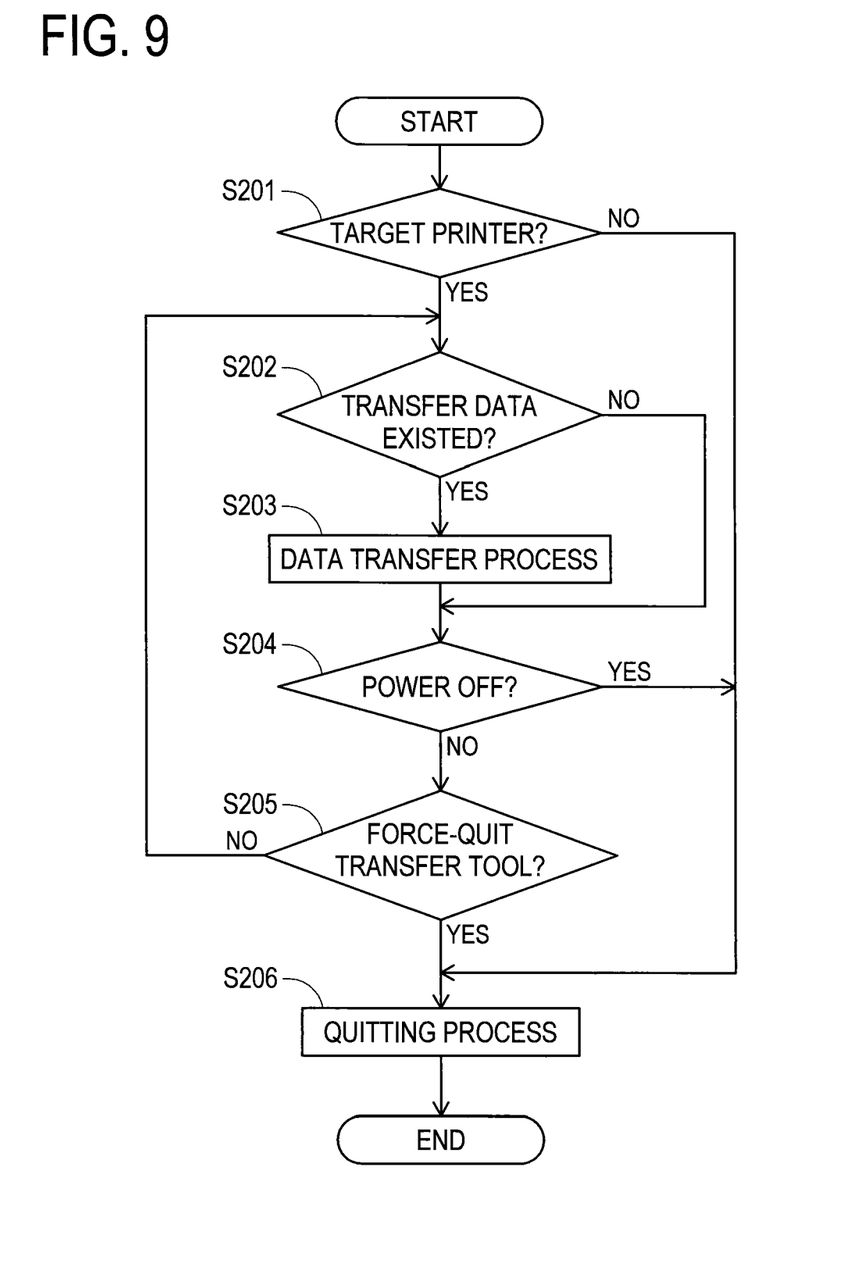
FIG. 9 is a flowchart of a program that realizes an operation of an automatic file transfer system directed to another embodiment of the disclosure.

The program as illustrated in the flowchart of FIG. 9 is executed in the personal computer 101 which is activated, in a manner similar to the one embodiment.

This program is a program designed to be activated when a printer which is recognized through the plug-and-play appears among the printers connected to the personal computer 101, and this program is to be executed on the RAM 109 after the program code is copied to the RAM 109 as above discussed. In the one embodiment, if a copied program code already exists on the RAM 109 and is executed on the RAM 109, the program code is not to be copied to the RAM 109 in this case. In this embodiment, however, even if the copied program code already exists in the RAM 109, the program code is still copied onto the RAM 109 independently. That is, in the one embodiment above, at most one copy of the program code is allowed to exist on the RAM 109 in a certain moment, but in this embodiment, plural copies of the program codes can exist on the RAM 109 in a certain moment. Furthermore, this program is the same regarding a point that this program is executed as a multitask program, and every time a printer which is recognized through the plug-and-play appears, one subject for executing this program is provided (one task to execute this program is generated) and this program is executed from the first step S101. However, in this program, each of a plurality of subjects (of the same number as the printers recognized through the plug-and-play) has a program code copied on the RAM 109, and each subject executes each corresponding program code copied. In this embodiment, similar to this program, the above transfer tool is not shared with plural subjects (plural tasks), and each subject has its own transfer tool for the corresponding copy. The transfer-destination counter 109a on the RAM 109 does not exist. When there are a plurality of subjects (tasks), a plurality of these programs (including transfer tools) are activated, and if a user carries out force-quitting with respect to one of them, the processes of the whole subjects (tasks) are terminated as a result of the force-quitting in the one embodiment above, for only one copied program code exists. In contrast, in this embodiment, when force-quitting, a user designates and terminates one of the plurality of these programs, and the other programs are not terminated.

The operation discussed below is an operation at one subject (one task). According to FIG. 9, in the operation of the automatic file transfer system 1 directed to this embodiment, the control unit 102 first determines, in S201, whether or not a printer where the power is turned on among the printers connected to the personal computer 101 is a "target printer." The printer where the power is turned on among the printers connected to the personal computer 101 is recognized through the plug-and-play by the control unit 102. It is determined in accordance with a piece of information written in the printer driver corresponding to the printer currently recognized, whether or not the printer recognized by the control unit 102 is a "target printer." That is, an area, which is not illustrated, where a printer driver is stored in the storage unit 107 is referenced for the determination.

Here, if the printer where the power is turned on among the printers connected to the personal computer 101 is a "target printer" (YES at S201), the control unit 102 shifts the process to S202.

At S202, the control unit 102 determines whether or not transfer data exists. In the determination, it is determined whether or not a new file is placed in the transfer folder whose location setting is set by a user. Here, if no transfer data exists, namely, if no new file is placed in the transfer folder whose location setting is set by a user (NO at S202), the control unit 102 shifts the process to S204 below without executing anything. Meanwhile, if transfer data exists, namely, if a new file is placed in the transfer folder whose location setting is set by a user (YES at S202), the control unit 102 shifts the process to S203.

At S203, a data transfer process is executed. The file newly placed in the transfer folder whose location setting is set by a user is transferred to the "target printer," whose power is recognized to be turned on. The control unit 102 then shifts the process to S204.

At S204, the control unit 102 determines whether or not the power of the "target printer" recognized at S201 above is turned off. Here, if the power of the "target printer" recognized at S201 above is not turned off (NO at S204), the control unit 102 shifts the process to S205.

At S205, the control unit 102 determines whether or not to force-quit the "transfer tool" with respect to the "target printer" recognized at S201 above. This determination is carried out by an operation of a user through the input unit 104. Here, if it is determined not to force-quit the "transfer tool" with respect to the "target printer" recognized at S201 above (NO at S205), the control unit 102 returns the process to S202 above. Meanwhile, if it is determined to force-quit the "transfer tool" with respect to the "target printer" recognized at S201 above (YES at S205), the control unit 102 shifts the process to S206.

At S206, the control unit 102 terminates the "transfer tool," and then terminates this program.

Further, at S204 above, if the "target printer" recognized at S201 above is powered off (YES at S204), the control unit 102 shifts the process to S206. At S206, the control unit 102 terminates the "transfer tool," and then terminates this program.

Further, if, at S201 above, the printer where the power is turned on among the printers connected to the personal computer 101 is not a "target printer" (NO at S201), the control unit 102 shifts the process to S206. At S206, the control unit 102 terminates the "transfer tool," and then terminates this program.

As has been discussed in detail, the automatic file transfer system 1 directed to this embodiment, namely, the automatic file transfer system 1 wherein an application program stored in the area 107a of the storage unit 107 is executed at the personal computer 101, is provided with the transfer folder 107b, 405, etc. configured to contain one or more files 601, 602, etc., and when the personal computer 101 recognizes through plug-and-play that the power is on at a printer among one or more printers 11A, 11B, 11C, 11D, etc. connected to the personal computer 101, the following processes (i) through (ii) are repeatedly executed for each printer thus recognized if the printer thus recognized is a printer of a transfer-target ("target printer") (YES at S201). That is, in the personal computer 101, and (i) it is determined whether or not a new file is moved to the transfer folder (whose location setting is set by a user) (S202), (ii) if it is determined that a new file is moved to the transfer folder (YES at S202), the new file is transferred to the printer currently recognized ("target printer") (S203), and accordingly, it is made possible to automatically transfer the new file moved to the transfer folder to the printer ("target printer") connected to the personal computer 101.

Accordingly, troubles in the operation to transfer a file can be saved, safe file transfer can be ensured, and erroneous file transfer can be prevented in a case where the same file is transferred to plural printers ("target printers").

Further, according to the automatic file transfer system 1 directed to this embodiment, namely, the automatic file transfer system 1 wherein an application program stored in the area 107a of the storage unit 107 is executed at the personal computer 101, the transfer folder 107b or 405 can be set within the local area network (LAN) 2 which connects the personal computer 101 to each of the one or more printers 11A, 11B, 11C, 11D, etc., therefore if a printer among the one or more printers 11A, 11B, 11C, 11D, etc. is arranged locally, being set through the connection of the local area network (LAN) 2, the above effects can still be obtained.

[6. Others]

While presently exemplary embodiments of the present disclosure have been shown and described, it is to be understood that this disclosure is for the purpose of illustration and that various changes and modifications may be made without departing from the scope of the disclosure as set forth in the appended claims.

For instance, if a transfer folder is set in the Web server 301, the transfer folder in the Web server 301 can be shared with the plurality of automatic file transfer systems 1 directed to the above embodiments each of which is locally arranged. Accordingly, even if the plurality of automatic file transfer systems 1 directed to the above embodiments each of which is locally arranged are located remotely from one another, the same effect can still be obtained in each of the plurality of automatic file transfer systems 1 directed to the above embodiments.

Further, in the above embodiments, the printers 11A, 11B, 11C, 11D, etc. are connected to the personal computer 101 through the connection with the local area network (LAN) 2, however, the printers 11A, 11B, 11C, 11D, etc. can be connected directly to the personal computer 101 without the connection through the local area network (LAN) 2.

Further, in the automatic file transfer system 1 directed to the above embodiments, an application program stored in the area 107a of the storage unit 107 is executed at the personal computer 101. That is, in the above embodiments, the application program is stored in the area 107a of the storage unit 107 which is a built-in storage medium in the personal computer 101; however, the application program may be stored in a storage medium connected or inserted to the personal computer 101.

What is claimed is:

1. An automatic file transfer system including a personal computer and one or more printers, the automatic file transfer system comprising:
   a transfer folder capable of containing one or more files,
   wherein, when the personal computer recognizes, through plug-and-play, that a printer among the one or more printers which are connected to the personal computer is powered on, if the printer currently recognized is a transfer-target printer, the personal computer executes in a repetitive manner, for the printer currently recognized, processes of:
   (i) determining whether or not a new file is moved into the transfer folder; and
   (ii) transferring, if it is determined that the new file is moved into the transfer folder, the new file to the printer currently recognized;
   wherein the personal computer comprises:
   a transfer-destination counter; and
   an input unit configured to transmit a force-quit signal, and
   wherein the personal computer executes processes of:
   (A) incrementing the transfer-destination counter by "1" if the personal computer recognizes, through the plug-and-play, that the printer among the one or more printers which are connected to the personal computer is powered on;
   (B) decrementing the transfer-destination counter by "1" if the personal computer recognizes that the printer currently recognized is powered off;
   (C) decrementing the transfer-destination counter by "1" if the force-quit signal is received from the input unit; and
   (D) terminating the processes (i) through (ii) if the transfer-destination counter indicates "0".

2. The automatic file transfer system according to claim 1, further comprising a network which connects the personal computer and each of the one or more printers, wherein the transfer folder is set within the network.

3. A non-transitory storage medium storing a program designed to execute processes (i) through (ii) below in a repetitive manner at an automatic file transfer system including a personal computer and one or more printers, using the personal computer, the automatic file transfer system comprising:
   a transfer folder capable of containing one or more files,
   wherein, when the personal computer recognizes, through plug-and-play, that a printer among the one or more printers which are connected to the personal computer is powered on, if the printer currently recognized is a transfer-target printer, the personal computer executes in a repetitive manner, for the printer currently recognized, the processes of:
   (i) determining whether or not a new file is moved into the transfer folder; and
   (ii) transferring, if it is determined that the new file is moved into the transfer folder, the new file to the printer currently recognized;
   wherein the personal computer comprises:
   a transfer-destination counter; and
   an input unit configured to transmit a force-quit signal, and
   wherein the personal computer executes processes (A) through (D), below in a repetitive:
   (A) incrementing the transfer-destination counter by "1" if the personal computer recognizes, through the plug-and-play, that the printer among the one or more printers which are connected to the personal computer is powered on;
   (B) decrementing the transfer-destination counter by "1" if the personal computer recognizes that the printer currently recognized is powered off;
   (C) decrementing the transfer-destination counter by "1" if the force-quit signal is received from the input unit; and
   (D) terminating the processes (i) through (ii) if the transfer-destination counter indicates "0".

4. The non-transitory storage medium according to claim 3, wherein the automatic file transfer system further comprises a network which connects the personal computer and each of the one or more printers, wherein the transfer folder is set within the network.

* * * * *